United States Patent [19]

Radtke

[11] 4,207,511

[45] Jun. 10, 1980

[54] CIRCUIT FOR CONSTANT VOLTAGE POWER SOURCE

[75] Inventor: Gerald W. Radtke, Milford, Mich.

[73] Assignee: Ford Motor Company, Dearborn, Mich.

[21] Appl. No.: 943,254

[22] Filed: Sep. 15, 1978

[51] Int. Cl.² .................... H02J 7/00; H02J 7/14
[52] U.S. Cl. ......................... 320/6; 320/15; 320/61
[58] Field of Search ...................... 320/2–6, 320/15, 56, 61

[56] References Cited

U.S. PATENT DOCUMENTS

| | | | |
|---|---|---|---|
| 1,898,370 | 2/1933 | Hughes et al. | 320/6 X |
| 2,044,917 | 6/1936 | Richardson | 320/6 X |
| 3,264,545 | 8/1966 | Kott | 320/56 X |
| 3,457,491 | 7/1969 | Black et al. | 320/61 X |
| 3,463,995 | 8/1969 | Herold | 320/6 |
| 3,603,973 | 9/1971 | Houch . | |
| 3,829,753 | 8/1974 | Marshall . | |
| 3,846,422 | 2/1972 | Hankly | 320/15 X |
| 3,921,049 | 11/1975 | Mellops et al. | |
| 3,949,289 | 4/1976 | Day . | |
| 4,004,208 | 1/1977 | Tamminen . | |

Primary Examiner—Robert J. Hickey
Attorney, Agent, or Firm—Peter Abolins; Clifford L. Sadler

[57] ABSTRACT

This specification discloses a circuit for a constant voltage power source. The circuit includes a vehicle charging means, such as an alternator, which charges a main battery designed for operating main vehicle electrical loads such as a starter motor and a secondary battery, designed for operating secondary vehicle electrical loads such as electronic components particularly sensitive to voltage variations and typically requiring a constant voltage input for operation. A resistor in series with the vehicle charging means and the secondary battery limits the rate of charging of the secondary battery. The main vehicle loads can be selectively connected to the circuit for operation by the vehicle charging means and/or the main battery. A diode in series with the secondary battery prevents the secondary battery from discharging through any path but the secondary vehicle loads. The secondary vehicle loads are connected across the secondary battery but can also receive current from any of the main battery, secondary battery and the vehicle charging means. When sufficient current and voltage is not available for the secondary vehicle loads from the main battery and the vehicle charging system, such as during cold cranking of the starter motor, the needed power can be supplied from the secondary battery. This is particularly advantageous because the secondary vehicle loads can include electronic circuits necessary for proper ignition of the vehicle engine.

6 Claims, 1 Drawing Figure

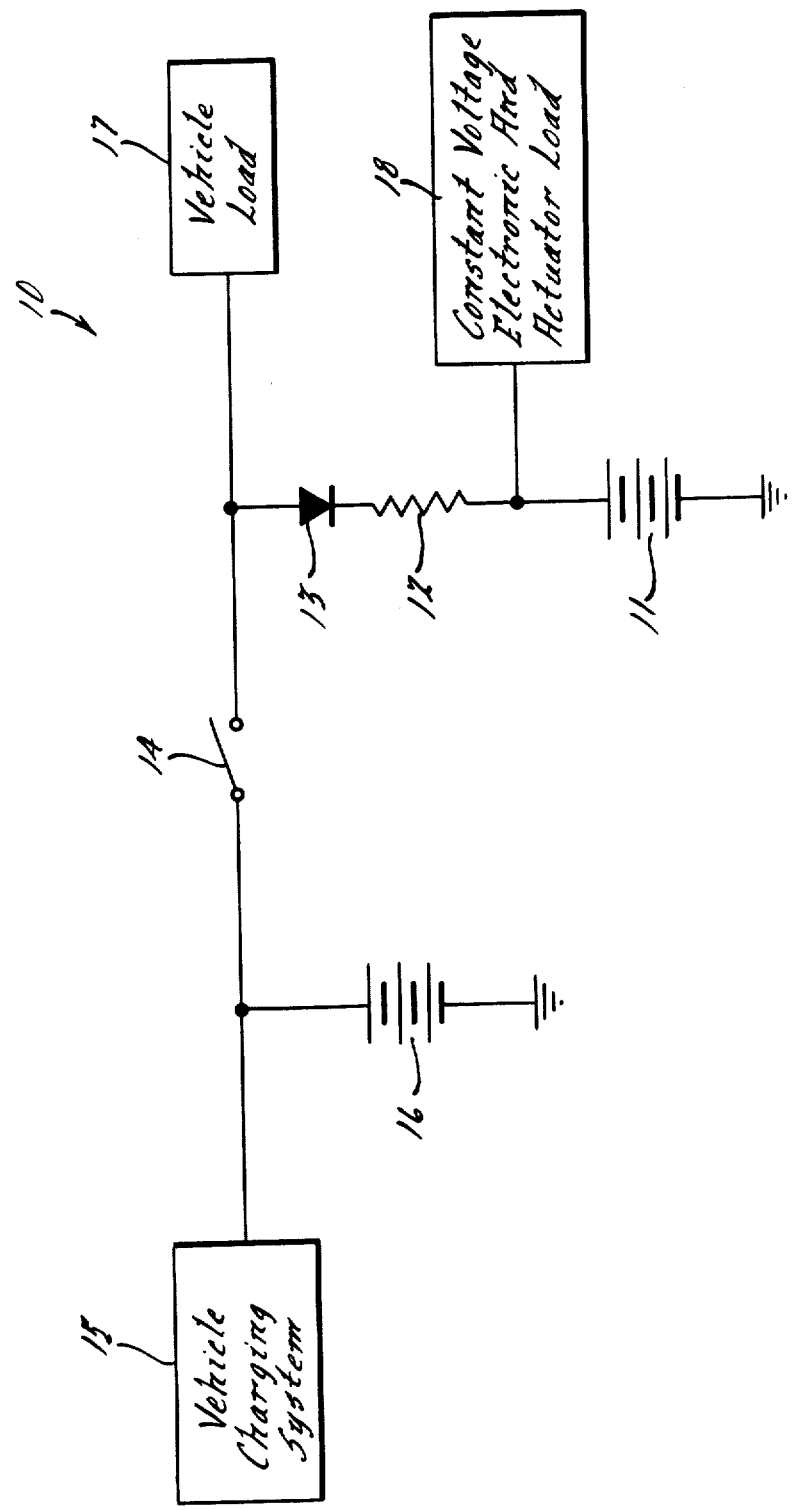

CIRCUIT FOR CONSTANT VOLTAGE POWER SOURCE

BACKGROUND OF THE INVENTION (1) Field of the Invention

This invention relates to providing a constant voltage power source in a vehicle.

(2) Prior Art

During recent years, there has been an increasing use of various electronic components in motor vehicles. For example, electronics is used in instrumentation which displays information such as time, speed, fuel level, and other information desired by the vehicle operator. Various other electronic vehicle controls include modules for governing the operation of vehicle occupant restraints, voltage regulators and low tire pressure sensors. There is also increasing use of electronics in entertainment and automotive communication equipment such as radios, tape players and citizen band transmitter/receivers. Electronics has also been incorporated into powertrain components which affect the ability of the car to start and to continue to run. For example, there are electronic components for alternators, distributors, speed control, ignition and engine emission controls.

Although use of electronic components in motor vehicles has many advantages, improper operation of such electronic components can severely affect the ability of the motor vehicle to function. For example, improper operation can be due to excessive variation in supply voltage which can occur during prolonged cranking of the starter motor during cold weather. There is a great current drain on the main vehicle battery which causes the voltage of the main battery to drop substantially and can result in inoperability of some electronic components. If these electronic components govern the ignition of the motor vehicle engine, the motor vehicle may remain inoperable.

The prior art teaches the use of reverse bias diodes in conjunction with the charging of a battery. For example, U.S. Pat. No. 3,921,049 issued on Nov. 18, 1975 to Mellors et al discloses a charging circuit for battery operated devices powered by solar cells. Further, U.S. Pat. No. 4,004,208 issued on Jan. 18, 1977 to Tamminen discloses a starting aid and reserve light for a vehicle wherein the starting aid includes a secondary battery which can be connected, in addition to the starter battery, to the starter motor. U.S. Pat. No. 3,463,995 issued to Herold on Aug. 26, 1969 teaches powering a starter motor by a main battery alone or by the main battery and a complementary battery in parallel. None of the aforementioned patents teach or suggest an integral electrical supply apparatus for powering motor vehicle electronic components requiring a constant voltage in situations when the voltage of the main battery has dropped to an undesirably low level. These are some of the problems this invention overcomes.

SUMMARY OF THE INVENTION

This invention recognizes that an ignition switch and a secondary battery charging through a resistor diode combination can be used in conjunction with a charging source to provide a constant voltage source for a secondary vehicle electrical load and remain isolated from a main vehicle electrical load. The secondary vehicle load differs from the main vehicle load in that it requires a constant voltage input for operating relatively complex electronic components. Charging of the secondary battery occurs only when the ignition switch is closed and connects the secondary battery to the charging source such as the main vehicle charging system or the main battery. The diode is reverse biased to prevent discharging the secondary battery through the vehicle charging system, the vehicle main battery and the main vehicle load. The configuration of the circuit permits the secondary vehicle load to be supplied from the main battery and the vehicle charging system as well as the secondary battery.

In accordance with an embodiment of this invention, a circuit for a constant voltage power supply source for operating a vehicle load includes a series connection having a vehicle charging means, a vehicle ignition switch, a diode, a resistive means for developing thereacross a portion of the voltage drop from the vehicle charging means and a secondary battery having polarities such that current can flow from the vehicle charging system through the diode to charge the secondary battery. Further, a main battery is connected in parallel across the vehicle charging means. A secondary vehicle load requiring a substantially constant applied voltage is connected in parallel across the secondary battery.

In such a system the secondary vehicle load is isolated from fluctuations in the main vehicle battery voltage and can provide a constant voltage source for operating on board vehicle electronics. The secondary battery is charged whenever the ignition switch is closed and there is charging current available from either the main vehicle charging system or the main vehicle battery. As a result, the invention provides an inexpensive, reliable and light weight constant power voltage source that can provide a constant power supply voltage to sensitive vehicle electronic circuits over a wide range of temperatures and modes of vehicle operation. The user need not be concerned with an external power supply charging system.

BRIEF DESCRIPTION OF THE DRAWING

The drawing is a schematic diagram in accordance with an embodiment of this invention for a circuit for a constant voltage power source for operating a motor vehicle electrical load.

DETAILED DESCRIPTION OF THE INVENTION

A circuit 10 for a constant voltage power source includes the series connection of a secondary battery 11, a resistor 12, a diode 13, an ignition switch 14, and a vehicle charging system 15. A main vehicle battery 16 is connected in parallel across vehicle charging system 15. A main vehicle electrical load 17 is connected across diode 13, resistor 12 and secondary battery 11. A secondary vehicle electrical load 18, including electronic components which require a constant voltage, is connected across secondary battery 11.

Main vehicle battery 16 has a negative terminal connected to ground and a positive terminal connected to the positive output of vehicle charging system 15. The negative terminal of vehicle charging system 15 is grounded. Secondary battery 11 has a negative terminal connected to ground, a positive terminal connected to one terminal of resistor 12, which has its other terminal connected to the negative side of diode 13. The positive side of diode 13 is connected to the positive terminal of vehicle charging system 15 through ignition switch 14.

In operation, closing ignition switch 14 and operating vehicle charging system 15, causes charging of main vehicle battery 16 and secondary battery 11. The trickle charging of secondary battery 11 is controlled partially by selecting resistor 12 to provide only about 10% of the ampere hour rating of secondary battery 11. This is particularly desirable when secondary battery 11 is a Ni CAD battery. Since secondary battery 11 is serially connected through diode 13 and resistor 12 to vehicle charging system 15, there is only a trickle charging of secondary battery 11. The requirements of main vehicle load 17 are supplied by current from either or both of vehicle charging system 15 or vehicle battery 16.

If the voltage across vehicle battery 16 should drop below a level whereby there is insufficient voltage at secondary vehicle load 18, secondary vehicle battery 11 can provide to secondary vehicle load 18 the desired electrical power. For example, cranking the starter motor when there is a low ambient temperature such as 0° F., can result in the voltage of main vehicle battery 16 dropping below the voltage required by secondary vehicle load 18 for proper operation. When ignition switch 14 is open, batteries 16 and 11 are isolated from one another and no charging or discharging takes place between the two batteries. When ignition switch 14 is closed and the voltage of main vehicle battery 16 drops below a normal operational level, diode 13 is reverse biased and prevents the discharge of secondary battery 11 through main battery 16.

Main vehicle battery 16 is usually a lead acid battery of 12 volts that has a capacity of from about 25 to about 50 ampere hours and a current capability of 200 amperes. Ignition switch 14 is typically a conventional solenoid switch which is actuated by operation of the starting key. A variety of rechargeable batteries are suitable for secondary vehicle battery 11 in addition to the aforementioned NiCAD battery. A typical secondary vehicle battery 11 can have an ampere-hour rating of about 1.25 and a voltage of about 3.75 volts.

Various modifications and variations will no doubt occur to those skilled in the various arts to which this invention pertains. For example, a rectifying device other than the semiconductor device disclosed can be used. These and all other variations which basically rely on the teachings through which this disclosure has advanced the art are considered within the scope of this invention as defined by the appended claims.

I claim:
1. A circuit for a constant voltage power source for operating a vehicle electrical load including:
   a series connection including a vehicle charging means, a vehicle ignition switch, a diode, a resistive means for developing thereacross a portion of the voltage drop from said vehicle charging means, and a secondary battery having polarities such that current can flow from said vehicle charging system through said diode to charge said secondary battery;
   a main battery connected in parallel across said vehicle charging means so that current can flow from said vehicle charging means and charge said main battery;
   a secondary vehicle load requiring a substantially constant applied voltage connected in parallel across said secondary battery;
   a main vehicle load connected in parallel across the series combination of said ignition switch and said main vehicle battery;
   said secondary battery and said main battery having a common ground and said resistive means and said diode being connected in series between said ignition switch and said secondary battery so that said resistive means does not draw current from said main battery and said vehicle charging means when said ignition switch is open and said secondary battery does not substantially discharge through said main vehicle load;
   said main battery having a substantially higher voltage and amperage capacity than said secondary battery; and
   said resistive means having a current carrying capacity of about 10% of the ampere-hour rating of said secondary battery.
2. A circuit as recited in claim 1 wherein said secondary vehicle load includes voltage sensitive electronic components which are supplied by a sufficiently high voltage for normal operation by said secondary battery even when the voltage across said main battery is substantially reduced from the voltage of said voltage charging means.
3. A circuit as recited in claim 2 wherein said secondary battery is of the rechargeable nickle cadmium type.
4. A circuit as recited in claim 3 wherein said diode is a semiconductor device.
5. A circuit as recited in claim 3 wherein said main vehicle load includes a vehicle starter motor.
6. A circuit for a constant voltage power source for use in a motor vehicle including:
   a vehicle charging means for providing a current source for charging a secondary vehicle battery and a main vehicle battery, said secondary vehicle battery being adapted to provide a substantially constant voltage source;
   said main battery being connected across said vehicle charging means and having a sufficient ampere hour rating to supply current for the operation of a vehicle starter motor;
   a series combination connected across said vehicle charging system including an ignition switch having a first and second terminal, said first terminal being connected to a node between said main battery and said vehicle charging means, said main battery having a positive and negative terminal, said negative terminal being connected to ground, and the series combination of a diode and a resistor being connected between the positive terminal of said main battery and the second terminal of said ignition switch;
   a main vehicle load, including the vehicle starter motor, being connected between said second terminal of said ignition switch and ground;
   a secondary vehicle load, including elements requiring a constant voltage, being connected between said positive terminal of said first battery and ground; and
   said resistor having a sufficient magnitude to permit only trickle charging of said secondary battery by said vehicle charging means and said diode being connected so as to prevent discharging of said secondary battery through any of said main vehicle load, said main battery and said vehicle charging means.

* * * * *